(12) United States Patent
Qian

(10) Patent No.: US 12,175,864 B2
(45) Date of Patent: Dec. 24, 2024

(54) METHOD OF CONTROLLING TRAFFIC FLOW AND SYSTEM PERFORMING THE SAME

(71) Applicant: Wuyang Qian, Nantong (CN)

(72) Inventor: Wuyang Qian, Nantong (CN)

( * ) Notice: Subject to any disclaimer, the term of this patent is extended or adjusted under 35 U.S.C. 154(b) by 343 days.

(21) Appl. No.: 17/752,624

(22) Filed: May 24, 2022

(65) Prior Publication Data

US 2023/0386329 A1    Nov. 30, 2023

(51) Int. Cl.

| | |
|---|---|
| *G06V 20/54* | (2022.01) |
| *G01S 17/86* | (2020.01) |
| *G06T 7/70* | (2017.01) |
| *G06V 40/10* | (2022.01) |
| *G08G 1/005* | (2006.01) |
| *G08G 1/01* | (2006.01) |
| *G08G 1/04* | (2006.01) |
| *G08G 1/052* | (2006.01) |
| *G08G 1/08* | (2006.01) |
| *H04N 7/18* | (2006.01) |
| *H04N 23/10* | (2023.01) |
| *H04N 23/90* | (2023.01) |

(52) U.S. Cl.
CPC ............... *G08G 1/08* (2013.01); *G01S 17/86* (2020.01); *G06T 7/70* (2017.01); *G06V 20/54* (2022.01); *G06V 40/10* (2022.01); *G08G 1/005* (2013.01); *G08G 1/0133* (2013.01); *G08G 1/0145* (2013.01); *G08G 1/04* (2013.01); *G08G 1/052* (2013.01); *H04N 7/18* (2013.01); *H04N 23/10* (2023.01); *H04N 23/90* (2023.01); *G06T 2207/10024* (2013.01); *G06T 2207/30196* (2013.01); *G06T 2207/30236* (2013.01); *G06T 2207/30242* (2013.01)

(58) Field of Classification Search
CPC ........ G08G 1/08; G08G 1/005; G08G 1/0133; G08G 1/0145; G08G 1/04; G08G 1/052; G08G 1/0116; G08G 1/087; G01S 17/86; G01S 17/88; G06T 7/70; G06T 2207/10024; G06T 2207/30196; G06T 2207/30236; G06T 2207/30242; G06V 20/54; G06V 40/10; H04N 7/18; H04N 23/10; H04N 23/90
See application file for complete search history.

(56) References Cited

U.S. PATENT DOCUMENTS

| | | | |
|---|---|---|---|
| 10,490,066 B2 | 11/2019 | Green et al. | |
| 10,650,673 B1* | 5/2020 | Elsheemy | .............. G08G 1/081 |
| 2013/0049985 A1* | 2/2013 | Eisenson | .............. G08G 1/0965 |
| | | | 340/902 |
| 2018/0096595 A1 | 4/2018 | Janzen et al. | |
| 2020/0242922 A1* | 7/2020 | Dulberg | ................. G08G 1/166 |
| 2020/0293796 A1 | 9/2020 | Mohammadabadi et al. | |
| 2021/0082297 A1* | 3/2021 | Jacobus | ................. G08G 1/163 |

(Continued)

*Primary Examiner* — Juan M Guillermety
(74) *Attorney, Agent, or Firm* — Chen-Chi Lin

(57) ABSTRACT

A method controls traffic at an intersection having three or more branches. The method comprising the steps of: capturing image data by a plurality of camera units positioned at the intersection; sending the image data to a control unit; determining from the image data a plurality of variables; and based on the plurality of variables, setting orders and durations of lights of a plurality of traffic lights positioned at the intersection. A system performs the method.

17 Claims, 5 Drawing Sheets

(56) References Cited

U.S. PATENT DOCUMENTS

2021/0334550 A1   10/2021  Cho et al.
2021/0347360 A1*  11/2021  de la Garza Villarreal ................. B60Q 9/00
2023/0176576 A1*  6/2023  Mandrioli ............ G08G 1/0112

* cited by examiner

METHOD OF CONTROLLING TRAFFIC FLOW AND SYSTEM PERFORMING THE SAME

CROSS-REFERENCE TO RELATED APPLICATIONS

The Disclosure made in U.S. Pat. No. 10,490,066 to Green et al., the Disclosure made in US Patent Application Publication No. 2021/0334550 to Cho et al., the Disclosure made in US Patent Application Publication No. 2020/0293796 to Mohammadabadi et al., and the Disclosure made in US Patent Application Publication No. 2018/0096595 to Janzen et al. are hereby incorporated by reference.

FIELD OF THE INVENTION

This invention relates generally to a method for controlling traffic at an intersection. More particularly, the present invention relates to a method for controlling traffic at an intersection and a system performing the method.

BACKGROUND OF THE INVENTION

U.S. Pat. No. 10,490,066 to Green et al. discloses the use of sensor systems such as light detection and ranging (LiDAR) systems and color cameras such as red green blue (RGB) cameras to determine traffic data, such as the number of vehicles at a crossing, the number of vehicles turning, and the paths taken by the vehicles. US Patent Application Publication No. 2021/0334550 to Cho et al. discloses an artificial intelligent (AI) algorithm implemented by hardware circuit or software. The AI algorithms classify and label at least one vehicle in the image. US Patent Application Publication No. 2020/0293796 to Mohammadabadi et al. discloses machine learning algorithms being trained to compute information corresponding to an intersection such as intersection bounding boxes, coverage maps, attributes, and distances. US Patent Application Publication No. 2018/0096595 to et al. discloses detection of the presence of emergency vehicles based upon the captured audio data by performing a classification process.

Advantages of instant disclosure include reduction of the number of right-angle collisions at an intersection; lower cost than those traffic controlling methods using in-ground inductive position sensors; and smoother traffic flows.

SUMMARY OF THE INVENTION

This invention discloses a method for controlling traffic at an intersection comprising three or more branches. The method comprising the steps of: capturing image data by a plurality of camera units positioned at the intersection; sending the image data to a control unit; determining from the image data a plurality of variables; and based on the plurality of variables, setting orders and durations of lights of a plurality of traffic lights positioned at the intersection.

DETAILED DESCRIPTION OF THE INVENTION

Figure 1:
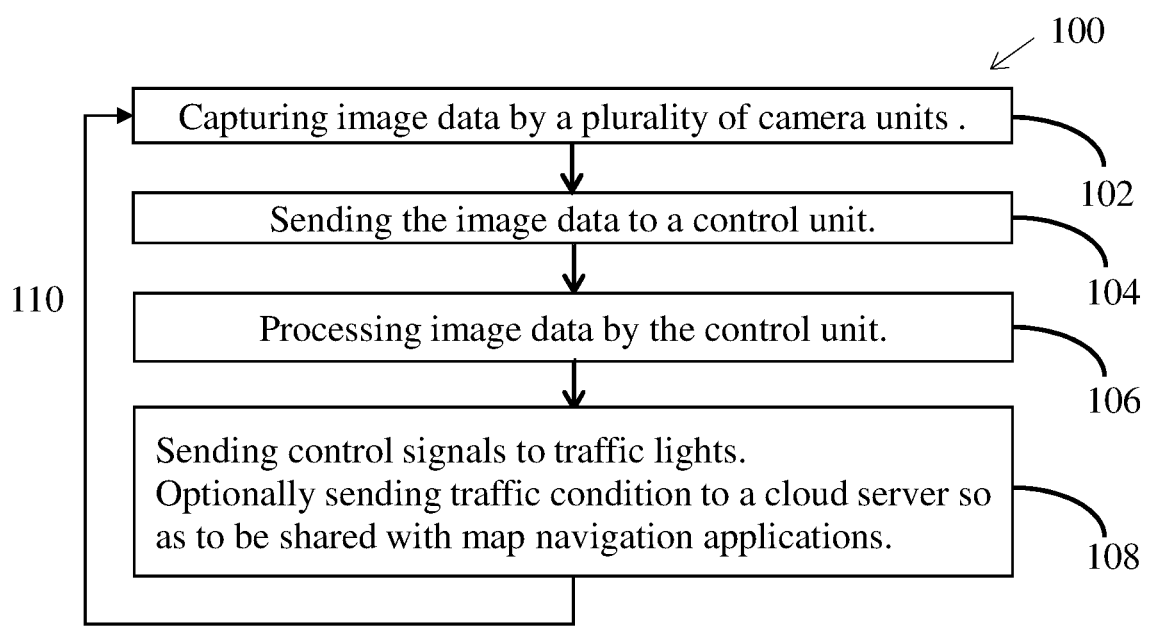
FIG. 1 is a flowchart of a method for controlling traffic at an intersection in examples of the present disclosure.

FIG. 1 is a flowchart of a method 100 for controlling traffic at an intersection in examples of the present disclosure. The intersection comprises three or more branches. For one example, an intersection 200 of FIG. 2 comprises three branches including a first branch 220, a second branch 240, and a third branch 260. The intersection 200 further comprises a plurality of road signs 212. For another example, an intersection 300 of FIG. 3 comprises four branches including a first branch 320, a second branch 340, a third branch 360, and a fourth branch 380. The method 100 may begin in block 102.

Figure 2:
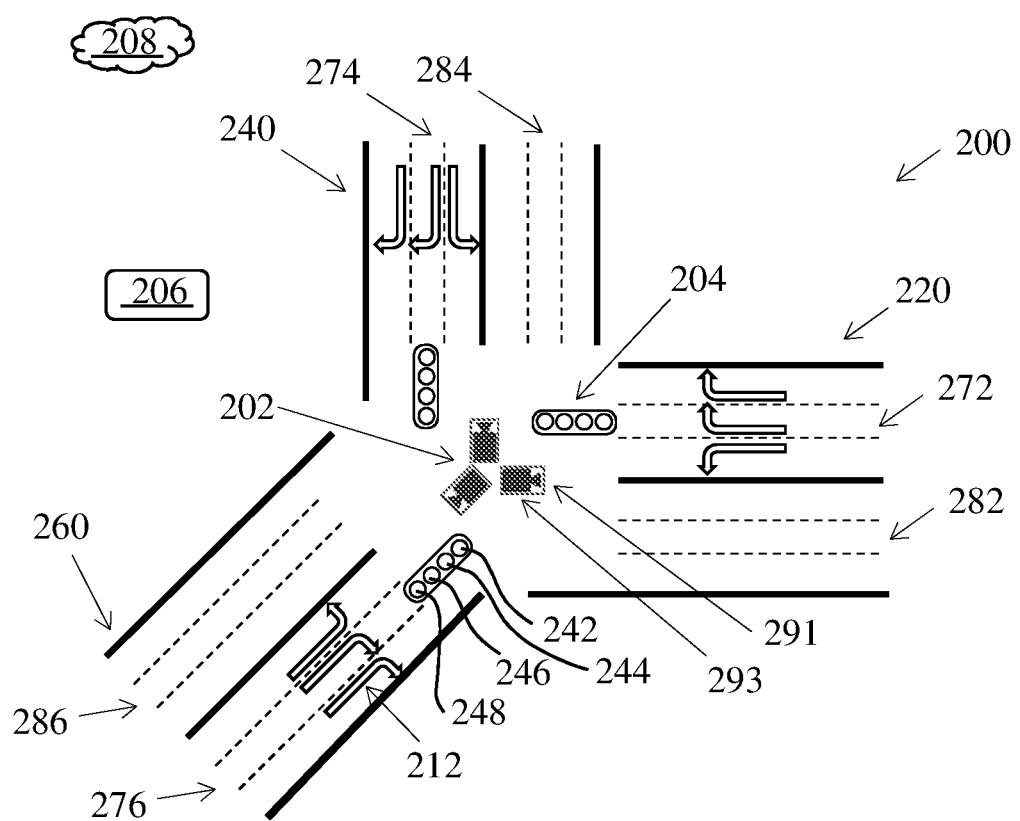
FIG. 2 shows an intersection with three branches in examples of the present disclosure.

In block 102, image data of each incoming direction (for example, each of incoming direction 272, incoming direction 274, and incoming direction 276 of FIG. 2) of the three or more branches are captured by a plurality of camera units (for example, a plurality of camera units 202 of FIG. 2) positioned at the intersection. In one example, the commands to capture image data are sent from a control unit 206 to the plurality of camera units 202 and the image data comprises streaming image data. In examples of the present disclosure, each of the plurality of camera units 202 comprises a red-green-blue (RGB) photographic camera 291 and a light detection and ranging (LiDAR) depth camera 293.

In examples of the present disclosure, license plate numbers of vehicles appeared in the videos or images may be removed by an AI algorithm. The videos or images may be used for traffic violation citations or as evidences for court proceedings. Block 102 may be followed by block 104.

In block 104, the captured image data of each incoming direction are sent to the control unit 206. Block 104 may be followed by block 106.

In block 106, the image data are processed by the control unit 206. Block 106 may be followed by block 108.

In block 108, switching-on timing, on-duration, switching-off timing, and off-duration of each light of a plurality of traffic lights 204 are predetermined. The switching-on timing, on-duration, switching-off timing, and off-duration of each light of the plurality of traffic lights 204 are then adjusted based at least on control signals sent from the control unit 206 to the plurality of traffic lights 204. For one example, each of the plurality of traffic lights comprises a red light, a yellow light, and a green light. For another example, each of the plurality of traffic lights 204 comprises a red light 242, a yellow light 244, a green light 246, and a left-turn light 248.

In examples of the present disclosure, traffic condition is sent to a cloud server 208 of FIG. 2 so as to be shared with map navigation applications (APPs). Block 108 may be followed by block 102 so as to form a loop 110.

Figure 3:
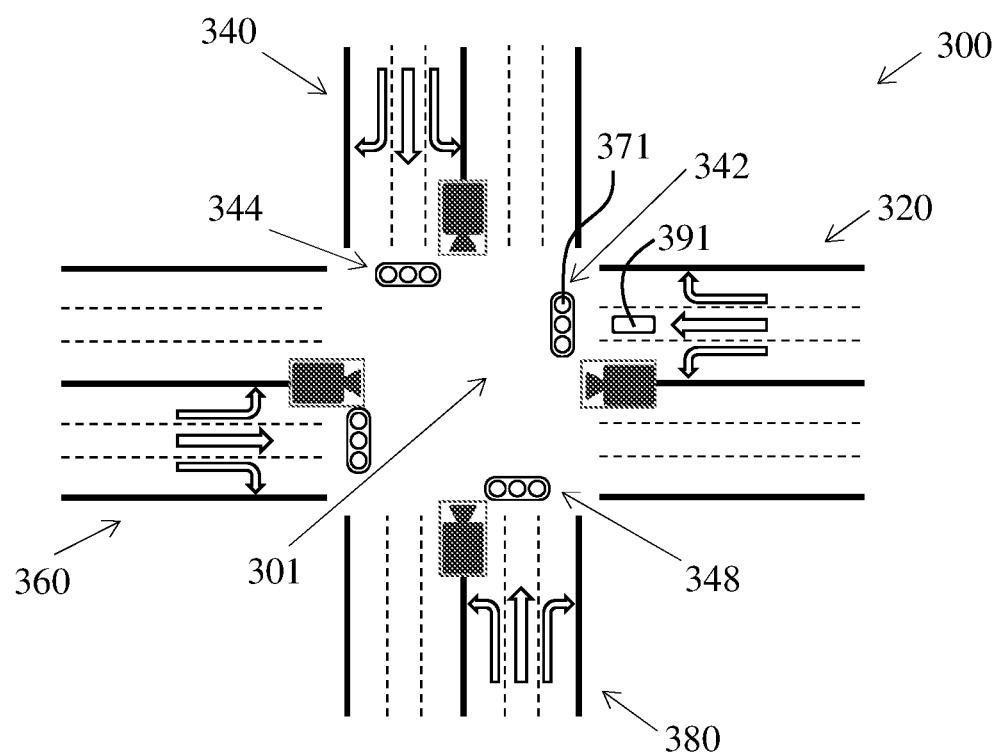
FIG. 3 shows an intersection with four branches in examples of the present disclosure.
Figure 4:
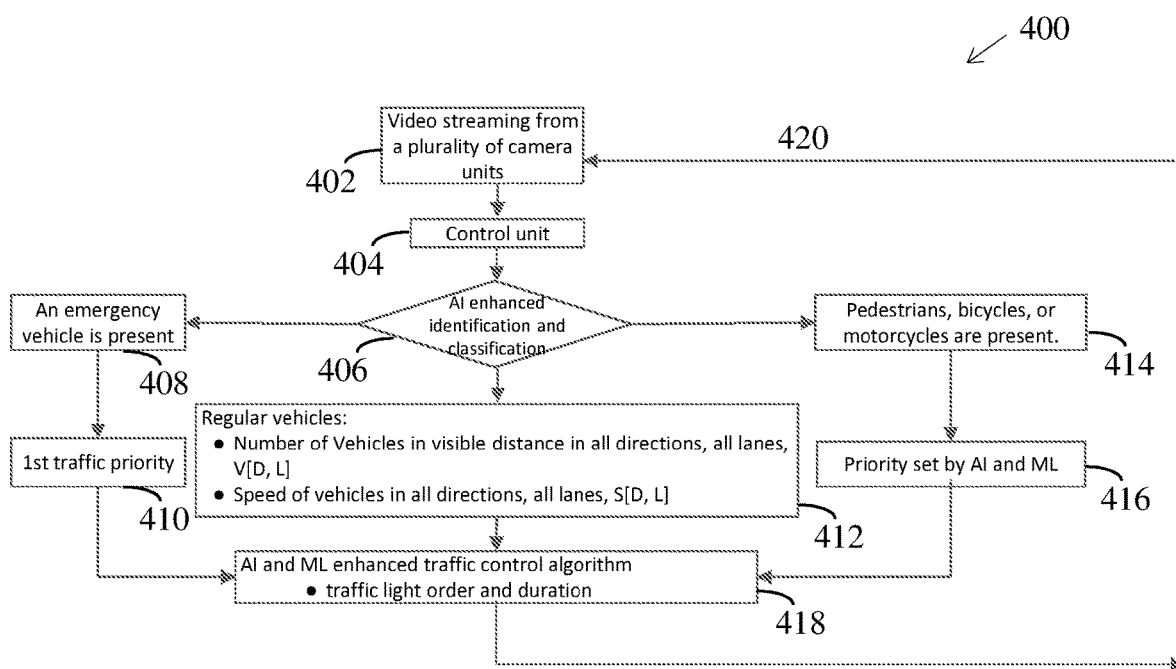
FIG. 4 is a flowchart of a method for controlling traffic at an intersection in examples of the present disclosure.

FIG. 4 is a flowchart of a method 400 for controlling traffic at an intersection in examples of the present disclosure. The intersection comprises three or more branches. For one example, an intersection 200 of FIG. 2 comprises three branches including a first branch 220, a second branch 240, and a third branch 260. For another example, an intersection 300 of FIG. 3 comprises four branches including a first branch 320, a second branch 340, a third branch 360, and a fourth branch 380. The method 400 may begin in block 402.

In block 402, image data of each incoming direction (for example, each of incoming direction 272, incoming direction 274, and incoming direction 276 of FIG. 2) of the three or more branches are captured by a plurality of camera units (for example, a plurality of camera units 202 of FIG. 2) positioned at the intersection. In one example, the commands to capture image data are sent from a control unit 206 to the plurality of camera units 202 and the image data comprises streaming image data. In examples of the present disclosure, each of the plurality of camera units 202 comprises an RGB photographic camera 291 and a LiDAR depth camera 293.

In examples of the present disclosure, image data of each outgoing direction (for example, each of outgoing direction 282, outgoing direction 284, and outgoing direction 286 of FIG. 2) of the three or more branches are captured by the plurality of camera units (for example, a plurality of camera units 202 of FIG. 2) positioned at the intersection. Block 402 may be followed by block 404.

In block 404, the captured image data of each incoming direction are sent to the control unit 206. In examples of the present disclosure, the captured image data of each incoming direction and each outgoing direction are sent to the control unit 206. Block 404 may be followed by block 406.

In block 406, the image data are processed by the control unit 206. Artificial intelligent (AI) enhanced identification and classification are determined. Block 406 may be followed by block 408, block 412, or block 414.

In block 408, from the image data of each incoming direction, it is determined that an emergency vehicle 391 of FIG. 3 is present. In one example, the emergency vehicle is an ambulance. In another example, the emergency vehicle is a fire engine. In still another example, the emergency vehicle is a police car. In examples of the present disclosure, one or more emergency flashlights or one or more sirens in the images or in the streaming videos are further used to classify if the emergency vehicle is as an ambulance, a fire engine, or a police car. Block 408 may be followed by block 410.

In block 410, the emergency vehicle 391 of FIG. 3 has the first (highest) priority. Because the emergency vehicle 391 is present, on-duration of a green light 371 of FIG. 3 of a traffic light 342 of FIG. 3 facing the emergency vehicle 391 is increased until the emergency vehicle 391 at least enters a center portion 301 of FIG. 3 of the intersection 300 of FIG. 3. Block 404 may be followed by block 406. If when the emergency vehicle 391 is detected, the green light 371 is off, then the green light 371 will be switched on and the red light of a traffic light 344 and the red light of a traffic light 348 will be switched on. In examples of the present disclosure, because an emergency vehicle 391 of FIG. 3 is present, the green light 371 of the traffic light 342 facing the emergency vehicle is flashing at a predetermined frequency so as to warn other vehicles to yield to the emergency vehicle 391. In one example, the predetermined frequency is 2 Hertz when the emergency vehicle 391 is not blocked by other vehicles. In another example, the predetermined frequency is 5 Hertz when the emergency vehicle 391 is blocked by another vehicle. Block 410 may be followed by block 418.

Figure 5:
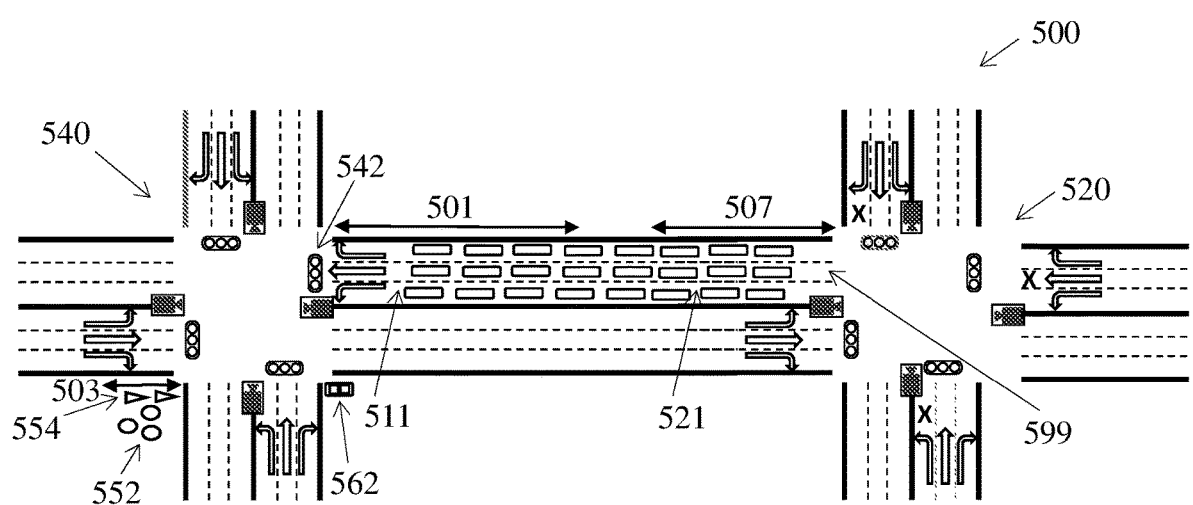
FIG. 5 shows two intersections in examples of the present disclosure.

In block 412, from the image data of each incoming direction, a respective number of a plurality of vehicles 511 of FIG. 5 in each incoming direction of the three or more branches within a predetermined distance 501 of FIG. 5 and a respective speed of each of the plurality of vehicles 511 are determined. FIG. 5 shows two intersections 500 in examples of the present disclosure. The two intersections 500 comprises a first intersection 520 and a second intersection 540.

The respective speed of each of the plurality of vehicles 511 of FIG. 5 is compared with a predetermined speed limit. In response to a determination that a speed of a speeding vehicle is above the predetermined speed limit, flashing a yellow light and a red light of a selected traffic light 542 of FIG. 5 facing the speeding vehicle. In one example, the flashing frequency is 1 Hertz when the speed of the speeding vehicle is less than 5 miles per hour (MPH) above the predetermined speed limit. In another example, the flashing frequency is 2 Hertz when the speed of the speeding vehicle is less than 10 MPH above the predetermined speed limit. In still another example, the flashing frequency is 3 Hertz when the speed of the speeding vehicle is less than 15 MPH above the predetermined speed limit. In yet still another example, the flashing frequency is 4 Hertz when the speed of the speeding vehicle is more than 15 MPH above the predetermined speed limit.

From the image data of each outgoing direction, a respective number of a plurality of outgoing vehicles 521 of FIG. 5 in each outgoing direction of the three or more branches within another predetermined distance 507 of FIG. 5 and a respective speed of each of the plurality of outgoing vehicles 521 are determined. Determine if a traffic jam condition is present when the respective number of the plurality of outgoing vehicles 521 is larger than a predetermined number and the respective speed of each of the plurality of outgoing vehicles 521 is smaller than a predetermined speed threshold. In one example, the predetermined speed threshold is 0 MPH. In another example, the predetermined speed threshold is 5 MPH. In still another example, the predetermined speed threshold is 10 MPH. In yet still another example, the predetermined speed threshold is 15 MPH. In response to a determination that the traffic jam condition is present for an outgoing direction 599 of FIG. 5, reducing on-duration of a green light of each traffic light allowing vehicles entering the outgoing direction 599 (see the three "X" mark in FIG. 5). Sending information of the traffic jam condition to a cloud server 208 of FIG. 2 so that a map with road conditions is updated and users of the map are notified. Block 412 may be followed by block 418.

In block 414, from the image data of each incoming direction, it is determined that pedestrians 552 of FIG. 5 or bicycles 554 of FIG. 5 are present at the intersection. A respective number of a plurality of pedestrians 552 and bicycles 554 in each incoming direction and each outgoing direction of the three or more branches within another predetermined distance 503 of FIG. 5 are determined. The predetermined distance 503 is shorter than the predetermined distance 501. Block 414 may be followed by block 416.

In block 416, priority of pedestrians' and bicycles' passing the streets are determined by AI and machine learning (ML) algorithm. Based at least on the respective number of the plurality of pedestrians 552 and bicycles 554, determine a plurality of cycles of switching-on timing and on-duration of each light of a plurality of pedestrian traffic lights 562 positioned at the intersection 540. Block 416 may be followed by block 418.

In block 418, traffic light orders and durations are determined by AI and ML algorithms. Block 418 may be followed by block 402 so as to form a loop 420.

Those of ordinary skill in the art may recognize that modifications of the embodiments disclosed herein are possible. For example, a number of cameras positioned at an intersection may vary. Other modifications may occur to those of ordinary skill in this art, and all such modifications are deemed to fall within the purview of the present invention, as defined by the claims.

The invention claimed is:

1. A method for controlling traffic at an intersection comprising three or more branches, the method comprising the steps of: capturing by a plurality of camera units positioned at the intersection, image data of each incoming direction of the three or more branches; sending the image data of each incoming direction to a control unit; determining from the image data of each incoming direction, a respective number of a plurality of vehicles in each incoming direction of the three or more branches within a predetermined distance and a respective speed of each of the plurality of vehicles; determining based at least in part on the respective number of the plurality of vehicles and the respective speed, a plurality of cycles of switching-on timing and on-duration of each light of a plurality of traffic lights positioned at the intersection; comparing the respective speed of each of the plurality of vehicles with a predetermined speed limit; and in response to a determination that a speed of a speeding vehicle is above the predetermined speed limit, flashing a yellow light and a red light of a selected traffic light facing the speeding vehicle; wherein the yellow light and the red light are flashing at a first frequency when the speed of the speeding vehicle is below a first threshold speed; wherein the yellow light and the red light are flashing at a second frequency when the speed of the speeding vehicle is between the first threshold speed and a second threshold speed; wherein the yellow light and the red light are flashing at a third frequency when the speed of the speeding vehicle is between the second threshold speed and a third threshold speed; wherein the second threshold speed is higher than the first threshold speed; wherein the third threshold speed is higher than the second threshold speed; wherein the first frequency is smaller than the second frequency; and wherein the second frequency is smaller than the third frequency.

2. The method of claim 1, wherein the image data comprises streaming image data; and wherein each of the plurality of camera units comprises a red-green-blue (RGB) photographic camera and a light detection and ranging (LiDAR) depth camera.

3. The method of claim 1, wherein the respective number and the respective speed are determined by an artificial intelligent algorithm.

4. The method of claim 1, wherein the step of determining from the image data of each incoming direction further comprises
determining, a respective number of a plurality of pedestrians and bicycles in each incoming direction and each outgoing direction of the three or more branches within an other predetermined distance; and
determining based at least in part on the respective number of the plurality of pedestrians and bicycles, a plurality of cycles of switching-on timing and on-duration of each light of a plurality of pedestrian traffic lights positioned at the intersection; wherein
the other predetermined distance is shorter than the predetermined distance.

5. The method of claim 1, wherein the step of determining from the image data of each incoming direction further comprises the sub-steps of
determining if an emergency vehicle is present; and
in response to a determination that the emergency vehicle is present, increasing on-duration of a green light of a traffic light facing the emergency vehicle until the emergency vehicle enters a center portion of the intersection.

6. The method of claim 5, wherein the sub-step of the determination that the emergency vehicle is present further comprising
flashing the green light of the traffic light facing the emergency vehicle at a predetermined frequency so as to warn other vehicles to yield to the emergency vehicle.

7. The method of claim 1 further comprising the steps of
capturing by the plurality of camera units, image data of each outgoing direction of the three or more branches;
sending the image data of each outgoing direction to the control unit;
determining from the image data of each outgoing direction, a respective number of a plurality of outgoing vehicles in each outgoing direction of the three or more branches within an other predetermined distance and a respective speed of each of the plurality of outgoing vehicles;
determining if a traffic jam condition is present when the respective number of the plurality of outgoing vehicles is larger than a predetermined number and the respective speed of each of the plurality of outgoing vehicles is smaller than a predetermined speed threshold; and
in response to a determination that the traffic jam condition is present for an outgoing direction, reducing on-duration of a green light of each traffic light allowing vehicles entering the outgoing direction.

8. The method of claim 7, wherein the step of determination that the traffic jam condition is present further comprises the sub-step of,
sending information of the traffic jam condition to a cloud server so that a map with road conditions is updated and users of the map are notified.

9. A system comprising a plurality of camera units positioned at an intersection comprising three or more branches; a plurality of traffic lights positioned at the intersection; and a control unit; wherein the system is configured to perform functions to: capture by the plurality of camera units, image data of each incoming direction of the three or more branches; send the image data of each incoming direction to the control unit; determine from the image data of each incoming direction, a respective number of a plurality of vehicles in each incoming direction of the three or more branches within a predetermined distance and a respective speed of each of the plurality of vehicles; determine based at least in part on the respective number of the plurality of vehicles and the respective speed, a plurality of cycles of switching-on timing and on-duration of each light of the plurality of traffic lights; capture by the plurality of camera units, image data of each outgoing direction of the three or more branches; send the image data of each outgoing direction to the control unit; determine from the image data of each outgoing direction, a respective number of a plurality of outgoing vehicles in each outgoing direction of the three or more branches within an other predetermined distance and a respective speed of each of the plurality of outgoing vehicles; determine if a traffic jam condition is present when the respective number of the plurality of outgoing vehicles is larger than a predetermined number and the respective speed of each of the plurality of outgoing vehicles is smaller than a predetermined speed threshold; and in response to a determination that the traffic jam condition is present for an outgoing direction, reduce on-duration of a green light of each traffic light allowing vehicles entering the outgoing direction; wherein determining from the image data of each incoming direction further comprises determining if an emergency vehicle is present and if the emergency vehicle is blocked; in response to a determination that the emergency vehicle is present and is not blocked, flashing a green light of a traffic light facing the emergency vehicle at a first frequency; and in response to a determination that the emergency vehicle is present and is blocked, flashing the green light of the traffic light facing the emergency vehicle at a second frequency; wherein the first frequency is smaller than the second frequency.

10. The system of claim 9, wherein the image data comprises streaming image data; and wherein each of the plurality of camera units comprises a red-green-blue (RGB) photographic camera and a light detection and ranging (LiDAR) depth camera.

11. The system of claim 9, wherein the system is configured to further perform functions to:
compare the respective speed of each of the plurality of vehicles with a predetermined speed limit; and
in response to a determination that a speed of a speeding vehicle is above the predetermined speed limit, flash a yellow light and a red light of a selected traffic light facing the speeding vehicle.

12. The system of claim 9, wherein determining from the image data of each incoming direction further comprises
determining if an emergency vehicle is present; and
in response to a determination that the emergency vehicle is present, increasing on-duration of a green light of a traffic light facing the emergency vehicle until the emergency vehicle enters a center portion of the intersection.

13. A non-transitory computer-readable storage medium storing instructions that, when executed by one or more processors of a control unit, cause the control unit to perform the steps of: instructing a plurality of camera units positioned at an intersection comprising three or more branches to capture image data of each incoming direction of the three or more branches; sending the image data of each incoming direction to the control unit; determining from the image data of each incoming direction, a respective number of a plurality of vehicles in each incoming direction of the three or more branches within a predetermined distance and a respective speed of each of the plurality of vehicles; determining based at least in part on the respective number of the plurality of vehicles and the respective speed, a plurality of cycles of switching-on timing and on-duration of each light of a plurality of traffic lights positioned at the intersection; comparing the respective speed of each of the plurality of vehicles with a predetermined speed limit; and in response to a determination that a speed of a speeding vehicle is above the predetermined speed limit, flashing a yellow light and a red light of a selected traffic light facing the speeding vehicle; wherein the yellow light and the red light are flashing at a first frequency when the speed of the speeding vehicle is below a first threshold speed; wherein the yellow light and the red light are flashing at a second frequency when the speed of the speeding vehicle is between the first threshold speed and a second threshold speed; wherein the yellow light and the red light are flashing at a third frequency when the speed of the speeding vehicle is between the second threshold speed and a third threshold speed; wherein the second threshold speed is higher than the first threshold speed; wherein the third threshold speed is higher than the second threshold speed; wherein the first frequency is smaller than the second frequency; and wherein the second frequency is smaller than the third frequency.

14. The non-transitory computer-readable storage medium of claim 13, wherein the image data comprises streaming image data; and wherein each of the plurality of camera units comprises a red-green-blue (RGB) photographic camera and a light detection and ranging (LiDAR) depth camera.

15. The non-transitory computer-readable storage medium of claim 13, wherein the step of determining from the image data of each incoming direction further comprises the sub-steps of
determining if an emergency vehicle is present; and
in response to a determination that the emergency vehicle is present, increasing on-duration of a green light of a traffic light facing the emergency vehicle until the emergency vehicle enters a center portion of the intersection.

16. The non-transitory computer-readable storage medium of claim 15, wherein the sub-step of the determination that the emergency vehicle is present further comprising
flashing the green light of the traffic light facing the emergency vehicle at a predetermined frequency so as to warn other vehicles to yield to the emergency vehicle.

17. The non-transitory computer-readable storage medium of claim 13, wherein the instructions further cause the control unit to perform the steps of:
capturing by the plurality of camera units, image data of each outgoing direction of the three or more branches;
sending the image data of each outgoing direction to the control unit;
determining from the image data of each outgoing direction, a respective number of a plurality of outgoing vehicles in each outgoing direction of the three or more branches within an other predetermined distance and a respective speed of each of the plurality of outgoing vehicles;
determining if a traffic jam condition is present when the respective number of the plurality of outgoing vehicles is larger than a predetermined number and the respective speed of each of the plurality of outgoing vehicles is smaller than a predetermined speed threshold; and
in response to a determination that the traffic jam condition is present for an outgoing direction, reducing on-duration of a green light of each traffic light allowing vehicles entering the outgoing direction.

* * * * *